(12) United States Patent
Lakshmikanthan et al.

(10) Patent No.: US 11,875,202 B2
(45) Date of Patent: Jan. 16, 2024

(54) VISUALIZING API INVOCATION FLOWS IN CONTAINERIZED ENVIRONMENTS

(71) Applicant: International Business Machines Corporation, Armonk, NY (US)

(72) Inventors: Chenthilraj Lakshmikanthan, Bangalore (IN); Ahamed Jalaldeen Shahul Hamid, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 17/471,507

(22) Filed: Sep. 10, 2021

(65) Prior Publication Data
US 2023/0083684 A1    Mar. 16, 2023

(51) Int. Cl.
*G06F 9/54* (2006.01)
(52) U.S. Cl.
CPC .................................. *G06F 9/547* (2013.01)
(58) Field of Classification Search
CPC . G06F 9/547; G06F 9/541; G06F 9/54; G06F 11/3409; G06F 11/301; G06F 11/302; G06F 11/3089; G06F 9/4484
See application file for complete search history.

(56) References Cited

U.S. PATENT DOCUMENTS

| 9,667,704 B1* | 5/2017 | Sonawane ............... H04L 67/63 |
| 10,382,257 B2 | 8/2019 | Nassar |
| 2015/0128156 A1* | 5/2015 | Zhu ........................ G06N 5/045 719/328 |
| 2018/0287876 A1* | 10/2018 | Strobel ................. H04L 41/142 |
| 2020/0167209 A1* | 5/2020 | Madhusudhan Nair .. G06F 9/54 |
| 2020/0296017 A1* | 9/2020 | Mazzitelli ............... H04L 41/22 |
| 2021/0044672 A1* | 2/2021 | Gilling .................. H04L 67/535 |
| 2021/0081271 A1 | 3/2021 | Doshi |
| 2021/0294717 A1* | 9/2021 | Wang .................. G06F 11/0772 |

OTHER PUBLICATIONS

Liu et al., "JCallGraph: Tracing Microservices in Very Large Scale Container Cloud Platforms" (2019), pp. 287-302) [retrieved from https://monadyn.github.io/Papers/CLOUD19.pdf]. (Year: 2019).*
Mell et al., "The NIST Definition of Cloud Computing", Recommendations of the National Institute of Standards and Technology, NIST Special Publication 800-145, Sep. 2011, 7 pages.

* cited by examiner

*Primary Examiner* — Brian W Wathen
(74) *Attorney, Agent, or Firm* — Nicholas A. Welling (57) ABSTRACT

An approach to generating end-to-end visualizations of invocations from coarse granular application programming interface (API) requests within a containerized environment may be presented. A coarse-granular API request may be intercepted. The coarse-granular API request may receive a unique identifier, which will be assigned to all invocations associated with the coarse-granular API request. Any invocations associated with the coarse-granular API within the containerized environment may be monitored. Detected invocations resulting from the coarse-granular API request may be annotated with a sequence number and the unique ID of the associated coarse-granular API request. An invocation flow for the coarse-granular API request may be generated based on the unique ID, relationship between the invocations and microservices, and the sequence number of the invocations.

20 Claims, 5 Drawing Sheets

VISUALIZING API INVOCATION FLOWS IN CONTAINERIZED ENVIRONMENTS

BACKGROUND OF THE INVENTION

The present invention relates generally to containerized computing environments, more specifically, to visualizing end-to-end coarse-granular application programming interface ("API") invocations across a containerized environment.

In cloud native solutions, business functionalities are implemented as microservices in containerized environments and exposed to consumers through coarse-granular APIs. When a coarse-granular API is invoked, it can invoke multiple microservices deployed across multiple containers, groups of application containers (i.e. PODs), or virtual clusters within a cluster of nodes delivering the functionality. Existing container monitoring approaches through container orchestration system API servers, object-state-metrics and node explorers can provide metrics such as health, input/output (I/O), network and memory usage of various containerized objects like deployments, nodes and PODS.

SUMMARY

According to one embodiment of the present invention, a computer-implemented method for visualizing end-to-end flow of microservice invocations from a coarse-granular application programming interface ("API") within a containerized environment is disclosed. The computer-implemented method includes intercepting the coarse-granular API request at an ingress module within the containerized environment. The computer-implemented method further includes annotating the coarse granular API request with a unique identifier ("ID"). The computer-implemented method further includes monitoring one or more invocations resulting from the coarse granular API request. The computer-implemented method further includes annotating one or more functions within one or more microservices invoked by the coarse-granular API request with a respective sequence number. The computer-implemented method further includes generating an invocation flow for the coarse-granular API request based on the unique ID associated with the coarse granular API request and the respective sequence number associated with the one or more functions within the one or more microservices.

According to another embodiment of the present invention, a computer program product for visualizing end-to-end flow of microservice invocations from a coarse-granular application programming interface ("API") within a containerized environment is disclosed. The computer program product includes one or more computer readable storage media and program instructions stored on the one or more computer readable storage media. The program instructions include instructions to intercept the coarse-granular API request at in ingress within the containerized environment. The program instructions further include instructions to annotate the coarse granular API request with a unique identifier. The program instructions further include instructions to monitor one or more invocations resulting from the coarse granular API request. The program instructions further include instructions to annotate one or more functions within one or more microservices invoked by the coarse-granular API request with a respective sequence number. The program instructions further include instructions to generate an invocation flow for the coarse-granular API request based on the unique ID associated with the coarse granular API request and the respective sequence number associated with the one or more functions within the one or more microservices.

According to another embodiment of the present invention, a computer system for visualizing end-to-end flow of microservice invocations from a coarse-granular application programming interface ("API") within a containerized environment is disclosed. The computer system includes one or more computer processors, one or more computer readable storage media, and program instructions stored on the computer readable storage media for execution by at least one of the one or more processors. The program instructions include instructions to intercept the coarse-granular API request at an ingress within the containerized environment. The program instructions further include instructions to annotate the coarse granular API request with a unique identifier. The program instructions further include instructions to monitor one or more invocations resulting from the coarse granular API request. The program instructions further include instructions to annotate one or more functions within one or more microservices invoked by the coarse-granular API request with a respective sequence number. The program instructions further include instructions to generate an invocation flow for the coarse-granular API request based on the unique ID associated with the coarse granular API request and the respective sequence number associated with the one or more functions within the one or more microservices.

The above summary is not intended to describe each illustrated embodiment of every implementation of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted and described herein recognize the benefits of visualizing the end-to-end flow of microservice invocations from coarse granular application programing interfaces ("API") to one or more microservices invoked and the functions invoked within the one or more microservices within a container environment (e.g., Docker®). Additionally, some embodiments appreciate collecting key metrics, for example, response time, network latency at multiple environment levels, individual microservices, and the functions within the microservice invoked by the coarse-granular API.

In an embodiment of the present invention, an interceptor application on an ephemeral layer may sit at specific points within a container environment and work in tandem or be part of a container orchestration program (e.g., Kubernetes®, Docker® Swarm). The ephemeral layer may detect coarse-granular API requests to microservices within the container environment and annotate the request and all functions resulting from the request in a hierarchical manner (e.g., sequentially). The functions may include any cascading functions at secondary or tertiary microservices to the initial request being received at the initial microservice. The annotations of the functions may be stored within a state database or key-value store, such as etcd. Upon a determination that the coarse-granular API request has reached completion, a visualization module can generate an end-to-end flow visualization of the coarse-granular API request within the container environment.

Additionally, in some embodiments, the flow of microservice invocations are intercepted at different abstraction layers within a cloud based container system. The flow of microservice invocations can be stored within the container system state database. The tracked flow of microservice invocations and associated metrics can be monitored and tracked in a hierarchy format, which describe the sequence and relationship between microservice invocations.

In an embodiment, the tracked flow of microservice invocations can persist for every coarse granular API request within the container state database. The tracked flow of microservice invocations can include runtime aspects of containerized solutions and dependencies associated with the microservices requested by the coarse-granular API. The persistent data can be utilized to generate a visualization for the coarse-granular API request.

In an embodiment of the invention, interceptors at different levels within a containerized orchestration system, such as Kubernetes, can detect and monitor coarse-granular APIs. Coarse-Granular APIs requests can be received outside the node cluster through an ingress controller. The request of the coarse-granular API will be tracked via an interceptor at the ingress controller. The interceptor tracks every request of the API and captures the flow of invocations in a hierarchical data structure (e.g., JSON/YAML format). Each request of the API will be annotated with a unique identifier ("ID") (e.g., incremental integer sequence starting from 1, and every request to function within a microservice will be annotated with a decimal sequence starting from the parent sequence number).

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
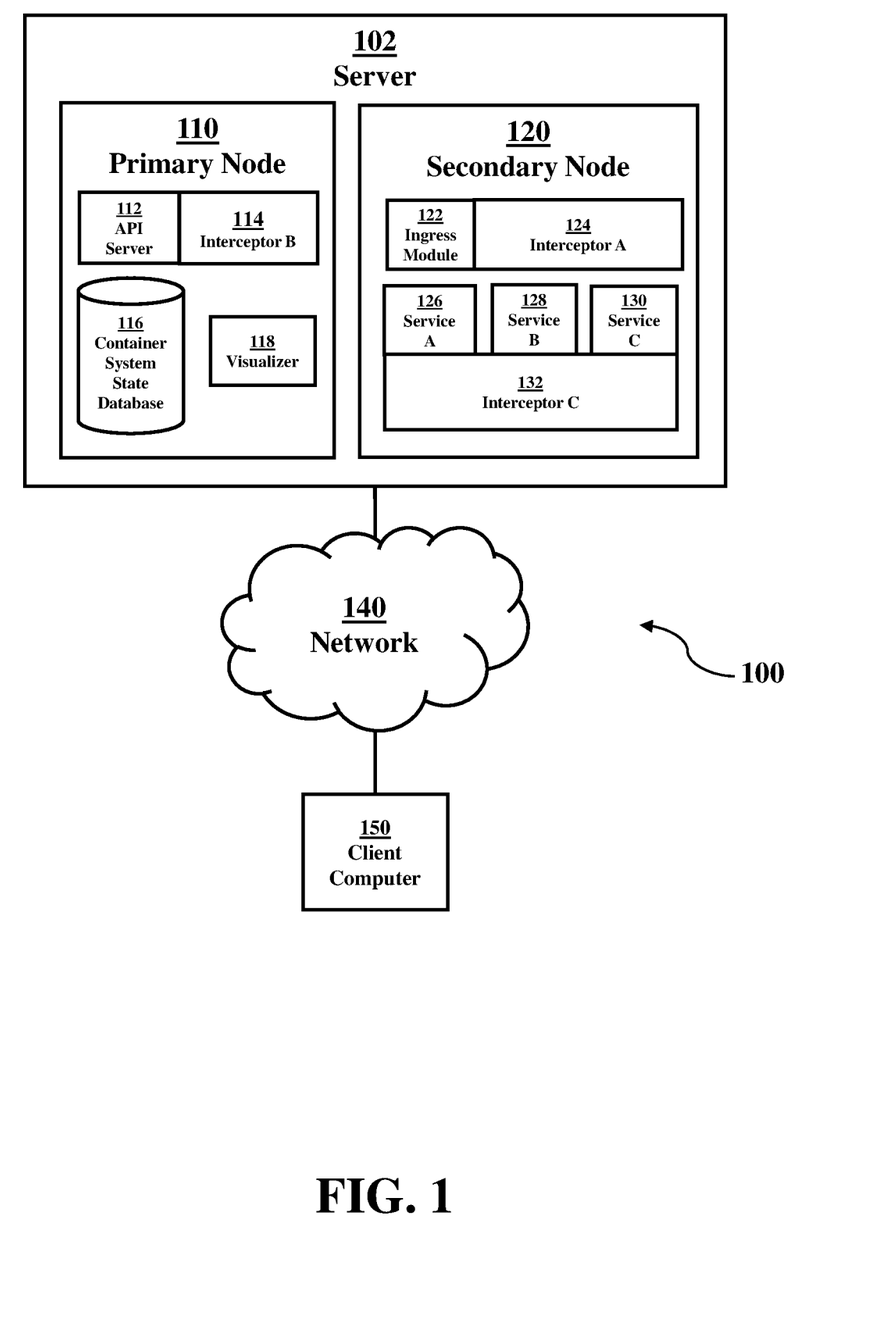
FIG. 1 is a functional block diagram generally depicting end-to-end coarse-granular application programming interface invocation visualization environment 100, in accordance with an embodiment of the present invention.

FIG. 1 is a functional block diagram depicting, generally, end-to-end coarse-granular application programming interface invocation visualization environment 100. End-to-end coarse granular application programming interface invocation visualization environment 100 comprises primary node 110 and secondary node 120 operational on server 102. As used herein, a primary node/secondary node relationship shall mean an asymmetric communication or control where the primary node (e.g., primary node 110) controls one or more other devices (e.g., secondary node 120) or processes running on one or more other devices. Also present in end-to-end coarse-granular application programming interface invocation visualization environment 100 is client computer 150 and network 140. Network 140 can support communications between the server 102 and client computer 150.

As shown in FIG. 1, the following computer modules are operational on primary node 110: API server 112, interceptor B 114, and visualizer 118. Also located on primary node 110 is container system state database 116. The following computer modules are operational on secondary node 120: ingress module 122, interceptor A 124, service A 126, service B 128, service C 130, and interceptor C 132.

Server 102 and client computer 150 can be a standalone computing device, a management server, a web server, a mobile computing device, or any other electronic device or computing system capable of receiving, sending, and processing data. In other embodiments, server 102 and client computer 150 can represent a server computing system utilizing multiple computers as a server system. It should be noted, while one server and one client computer are shown in FIG. 1, end-to-end coarse granular application programming interface invocation visualization environment 100 can have any number of servers and client computers (e.g. 1, 2, n . . . n+1). In another embodiment, server 102 and client computer 150 can be a laptop computer, a tablet computer, a netbook computer, a personal computer, a desktop computer, or any programmable electronic device capable of communicating with other computing devices (not shown) within an environment for end-to-end coarse granular application programming interface invocation visualization environment 100 via a network, such as network 140.

In another embodiment, server 102 and client computer 150 represent a computing system utilizing clustered computers and components (e.g., database server computers, application server computers, etc.) that can act as a single pool of seamless resources when accessed within end-to-end coarse granular application programming interface invocation visualization environment 100. Server 102 and client 150 can include internal and external hardware components, as depicted, and described in further detail with respect to FIG. 3.

Primary node 110 can be a container node within a containerized environment. Operational on primary node 110 are API server 112, interceptor B 114, and visualizer 118. Also located on primary node 110 is system state database 116. Primary node 110 can be configured to control and manage secondary node 120 within a container orchestration system (e.g., Kubernetes® or Docker Swarm®). For example, primary node 110 can manage load balancing between multiple secondary nodes 120 and assign incoming requests for service functions based on available resources or latency needs.

While one primary node 110 is shown in FIG. 1, multiple primary nodes 110 can be present within end-to-end coarse granular application programming interface invocation visualization environment 100. Multiple primary nodes 110 can be distributed among multiple servers. In an embodiment, multiple primary nodes 110 are preferred because it allows for redundancy if a primary node fails.

API server 112 is a computer module operational on primary node 110. API server 112 exposes the container orchestration components within end-to-end coarse granular application programming interface invocation visualization environment 100 to a client API. For example, if a client API is a coarse-granular API that makes multiple request for service invocations within the container environment. In an embodiment, API server 112 can be the front end tool that allows for a user to interact with the container orchestration system. It should be noted, multiple instances of API server 112 can be operational on primary node 110. The multiple instances of API server 112 can scale depending on the volume of client traffic and balance the traffic between the multiple instances.

In another embodiment, API server 112 validates and configures data for the API objects which include pods, services, replication controllers, and others. The API server 112 services REST operations and provides the front end to the cluster's shared state through which all other components interact.

Interceptor B 114, interceptor A 124, and interceptor C 132 are computer modules that can detect traffic across secondary node 120 associated with a coarse-granular API request. In additional embodiments, interceptor B 114 can monitor traffic associated with a coarse granular API request across multiple secondary nodes. It should be noted interceptor B 114, interceptor A 124, and interceptor C 132 can be part of a single computer module that can be operational on primary node 110 or operate independently of each other and collaborate to update metrics and key-value pairs within container system state database 116. For example, interceptor B 114 can be a principal module, which can be operational on primary node 110. Interceptor A 124 and interceptor C 132 can be controlled by interceptor B. In FIG. 1, interceptor B 114, interceptor A 124, and interceptor C 132 are shown in contact with their respective modules for simplicity and ease of explanation. Interceptor A 124 can be associated with ingress module 122 (described in more detail below). Interceptor C 132 can be associated with service A 126, service B 128 and service C 130 (described in more detail below).

In an embodiment, interceptor A 124 can detect incoming API requests at ingress module 122. The API request can be a coarse-granular API request, which is a single request that causes multiple function invocations from service A 126, service B 128 and/or service C 130. Interceptor A 124 can assign a unique ID to a detected coarse granular API request. For example, a user can interact with an API via client computer 150 (e.g., through a web browser or application portal). Client computer 150 can transmit a coarse granular API request via network 140 to server 102. Ingress module 122 can receive the coarse granular API request. Ingress module 122 can act as a gateway which verifies and authenticates the coarse granular API request. Upon ingress module 122 authentication of a coarse-granular API request, interceptor A 124 can annotate the API request with a unique ID and store the unique ID and coarse granular API request in system state database 116. In another embodiment, interceptor B 114 can inject runtime sequence data into the header of the incoming coarse-granular API request. Further, interceptor B 114 can annotate which node receives the coarse-granular API request and update the information in container system state database 116.

In an embodiment, interceptor C 132 is in connection with service A 126, service B 128, and service C 130. Interceptor C 132 can be configured to identify function invocations within any of the services and determine if the invocation is due to a coarse-granular API request (e.g., via the unique identifier assigned by interceptor B 114 embedded within the header of the coarse-granular API request). If the invocation is due to a coarse-granular API request, interceptor C 132 can assign a sequence number to the invoked function and save metrics associated with the microservice invocation. For example, multiple services may be initially invoked by a coarse-granular API. Service A 126 may initialize one function, while service B 128 calls to service C 130 that has not been utilized with the initial request. Interceptor C 132 could detect the invoked function assigning the initialized function within service A 126 as "A.01" within the sequence, and the call made to service C 130 by service B 128 as "A.02". A response to Service B's call to service C could be annotated as "A.03".

Interceptor A 124 can monitor and/or track incoming functions across one or more secondary nodes 120. In an embodiment, coarse-granular API requests received at ingress module 122 can be sent to API server 112 on primary node 110. The purpose of primary node 110 is to ensure efficient utilization of resources across the container environment. Any actions taken by API server 112 can be intercepted and noted by interceptor B 114. For example, if a microservice function associated with a coarse-granular API on a node invokes a second microservice function and API server assigns the function to a different secondary node, interceptor B will extract the function request to the second node from the header request associated with the reassignment of resources for the secondary node and for the second microservice.

In an embodiment, interceptor C 132 can track communications between services within different function calls within a containerized application on secondary node 120. For example, a first microservice invocation on a secondary node 120 may cause a microservice function invocation. API server 112 can balance the resource utilization among secondary nodes by assigning the microservice function to a secondary node with more available resources or better latency to client computer 150. Further, interceptor C 132 can extract the coarse-granular API request unique ID associated with the microservice function invocation from the header of the assignment from API server 112. Interceptor 132 can store the assignment to the new secondary node within system state database 116.

Visualizer 118 is a computer program that can generate various end-to-end visualizations of the invoked microservice functions associated with a coarse-granular API request. The visualization generation may be based on the sequential or metadata captured by interceptor A 124, interceptor B 114 and interceptor C 132. Further, the basis of the visualization can be in chart, graph, or Merkle tree format. In an embodiment, visualizer 118 can utilize metadata stored within system state database 116 to generate an end-to-end visualization of the coarse-granular API request. Further, the generated visualization can be sent to client computer and presented on a graphical user interface for a user (e.g., developers, devops, etc. . . . ).

Also shown in FIG. 1 are service A 126, service B 128, and service C 130 operational on secondary node 120. A service is a named endpoint where requests from a coarse-granular API are sent. A service does not perform any work, but instead requests sent to a service are sent to a workload to perform the actual work to process the service's request. A service can route to more than one workload, and a workload can process requests for one or more services. While only service A 126, service B 128 and service C 130 are shown in FIG. 1, any number of services can be present within end-to-end coarse granular application programming interface invocation visualization environment 100.

In an embodiment, service A 126, service B 128, and service C 130 can be microservices. Microservices allow for the breakdown of complex applications into simple independent processes, allowing for a de-coupled system to be produced. The microservices may be executed in containers to create containerized applications in a containerized computing service platform (i.e., platform as a service cloud computing). Additionally, service A 126, service B 128, and service C 130 may contain workloads. A workload can be a "pod". A pod may refer to a group of one or more containers that are deployed together on the same node. Workloads perform the work within a microservice. For example, a workload may process Hypertext Transport Protocol (HTTP) requests and return HTTP responses.

In an embodiment, applications (not shown) can also be located on service A 126, service B 128 and service C 130. An application is made up of workloads that have an "app" label applied to them (the app name is the value of the app label). Apps can be versioned by another label called "version". If a workload has a label of "app=details" with another label "version=v1", then this workload is a "Versioned app" whose name is "details v1".

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between server 102, and client computer 150.

Figure 2:
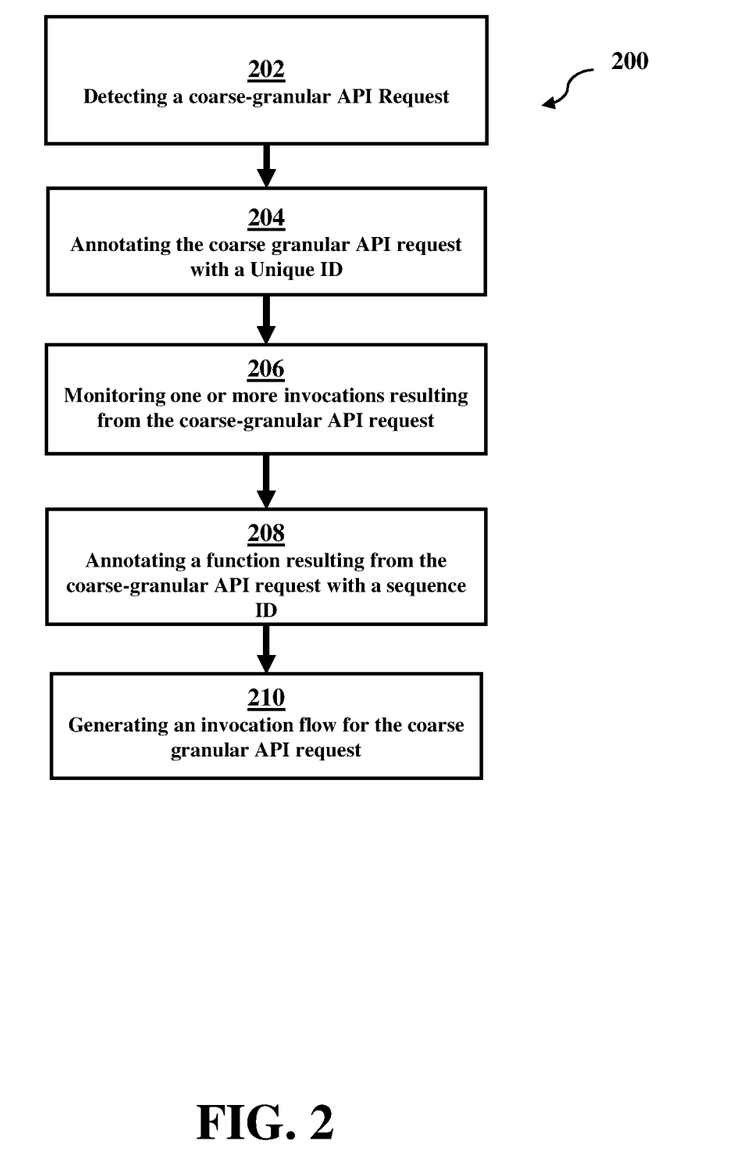
FIG. 2 is a flowchart depicting operational steps of a method for generating a visualization of the end-to-end flow of microservice invocations from a coarse-granular application programming interface request, in accordance with an embodiment of the present invention.

FIG. 2 is a flowchart, generally designated 200, depicting operational steps of generating an end-to-end visualization of a coarse-granular API request. At step 202, interceptor A 124 can detect a coarse-granular API request from client computer 150 via ingress module 122 at secondary node 120. At step 204, annotate the coarse-granular API request with a unique ID via interceptor A 124. In an embodiment, interceptor A 124 can annotate the coarse-granular API request with a unique ID. At step 206, interceptor B 114 can monitor invocations across secondary node 120 resulting from the coarse-granular API request. At step 208, interceptor C 132 can annotate a function on service A 126, service B 128, and/or service C 130 with a sequential or hierarchy identifier and store the annotation within system state database 116. At step 210, visualizer 118 can generate an end-to-end visualization of the invocations associated with a coarse-granular API request in the containerized environment utilizing the metadata and annotations stored within system state database 116.

Figure 3:
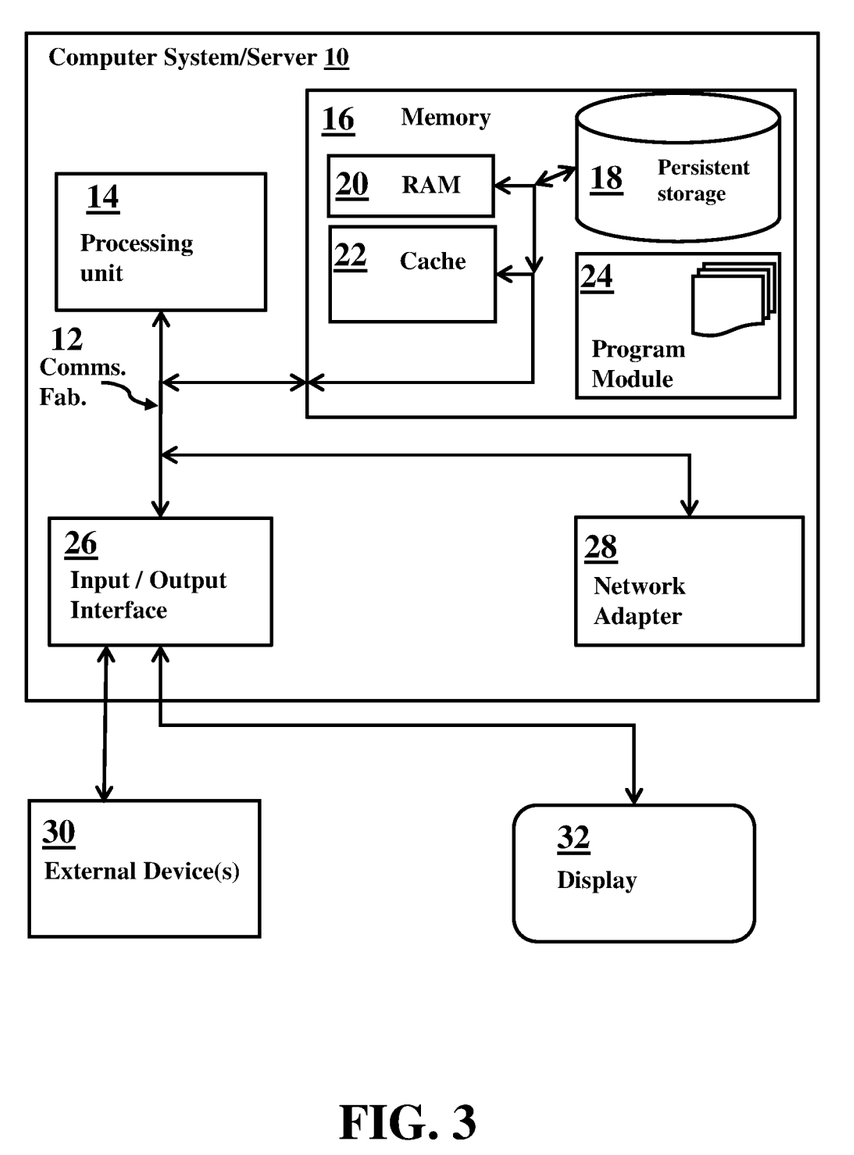
FIG. 3 is a functional block diagram of an exemplary computing system within end-to-end coarse-granular application programming interface invocation visualization environment 100, in accordance with an embodiment of the present invention.

FIG. 3 depicts computer system 10, an example computer system representative of a dynamically switching user interface computer 10. Computer system 10 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 10 includes processors 14, cache 22, memory 16, persistent storage 18, network adaptor 28, input/output (I/O) interface(s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes random access memory 20 (RAM). In general, memory 16 can include any suitable volatile or non-volatile computer readable storage media. Cache 22 is a fast memory that enhances the performance of processors 14 by holding recently accessed data, and data near recently accessed data, from memory 16. As will be further depicted and described below, memory 16 may include at least one of program module 24 that is configured to carry out the functions of embodiments of the invention.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
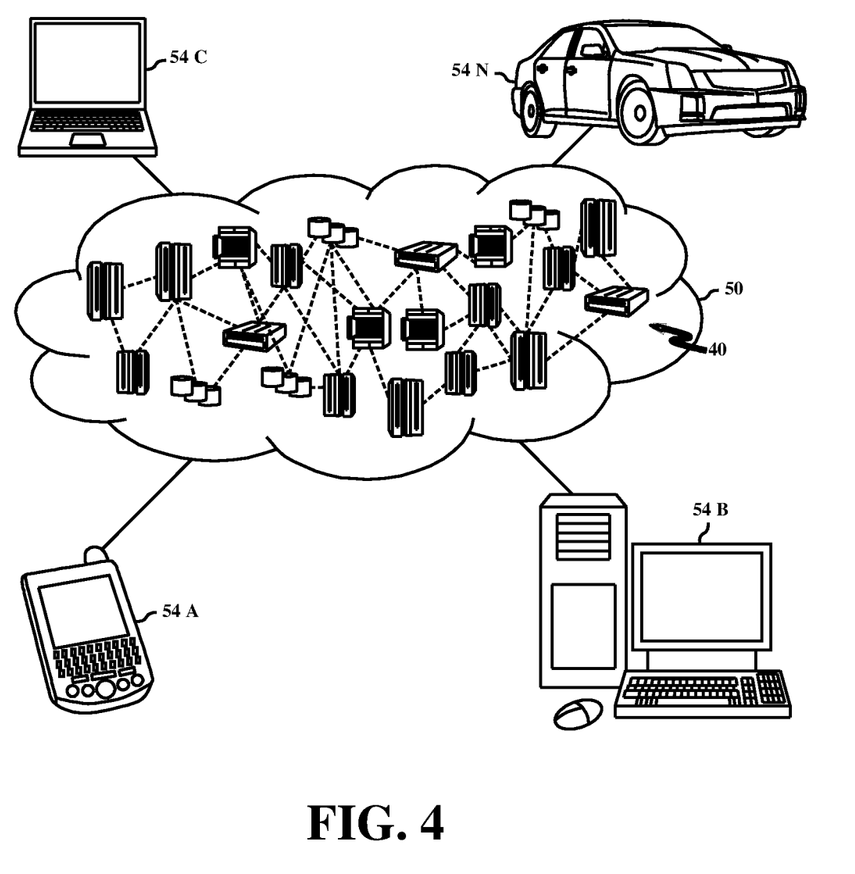
FIG. 4 is a diagram depicting a cloud computing environment, in accordance with an embodiment of the present invention.

FIG. 4 is a block diagram depicting a cloud computing environment 50 in accordance with at least one embodiment of the present invention. Cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
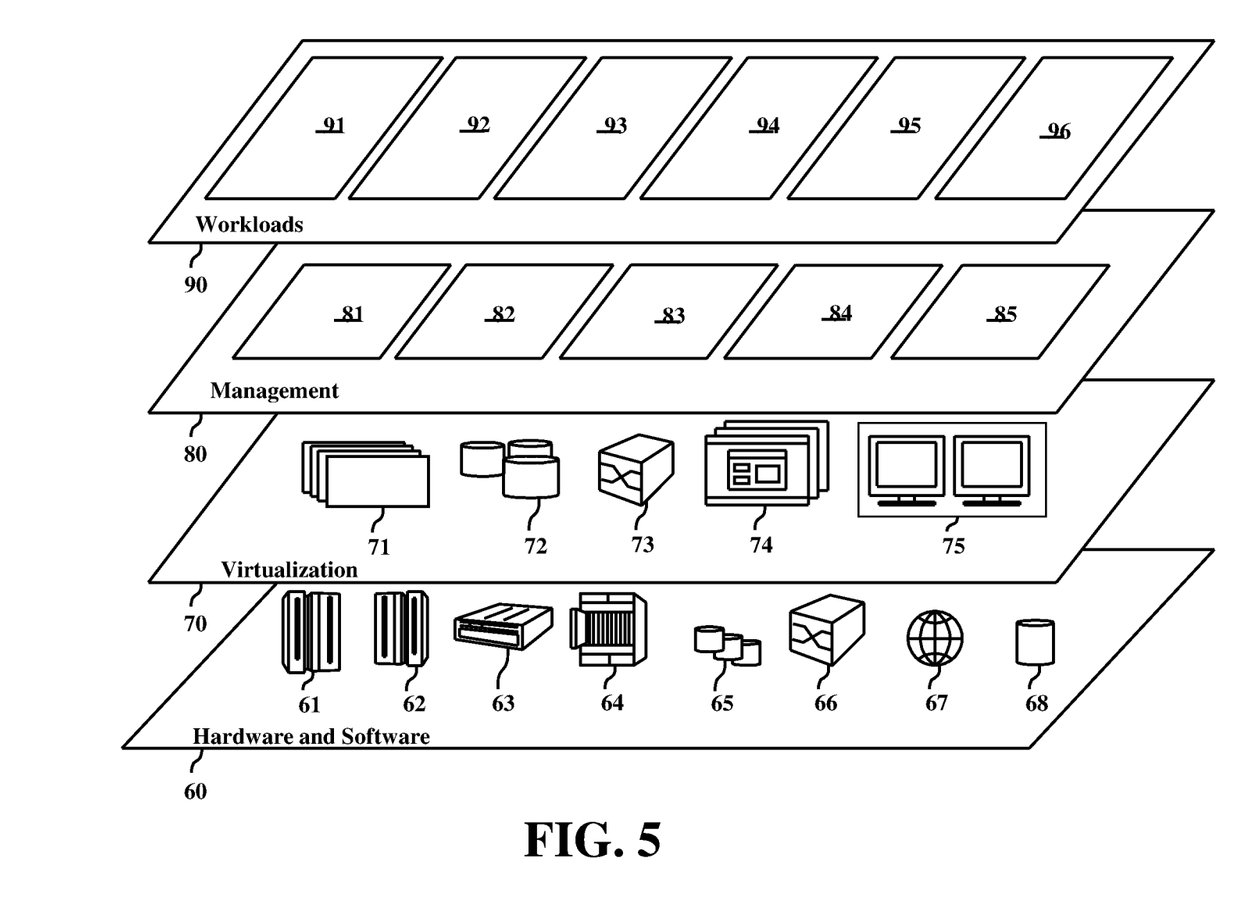
FIG. 5 is a functional block diagram depicting abstraction model layers, in accordance with an embodiment of the present invention.

FIG. 5 is a block diagram depicting a set of functional abstraction model layers provided by cloud computing environment 50 depicted in FIG. 4 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and end-to-end coarse-granular API invocation visualization 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for visualizing end-to-end flow of microservice invocations from a coarse-granular application programming interface ("API") within a containerized environment, the computer implemented method comprising:
   intercepting the coarse-granular API request at an ingress within the containerized environment;
   annotating the coarse granular API request with a unique identifier ("ID");
   monitoring one or more invocations resulting from the coarse granular API request;
   annotating one or more functions within one or more microservices invoked by the coarse-granular API request with a respective sequence number; and
   generating an invocation flow for the coarse-granular API request based on the unique ID associated with the coarse-granular API request and the respective sequence number associated with the one or more functions within the one or more microservices.

2. The computer-implemented method of claim 1, wherein monitoring one or more invocations resulting from the coarse granular API request further comprises:
   intercepting the one or more invocations resulting from the coarse granular API request at the one or more microservices invoked by the coarse-granular API request; and
   extracting the unique ID from the invocation associated with a microservice invocation.

3. The computer-implemented method of claim 1, further comprising:
   updating a containerized environment state database with the unique ID of the coarse-granular API and respective sequence number of the one or more functions within the or more microservices invoked by the course granular API request.

4. The computer-implemented method of claim 3, wherein updating the containerized environment state database further comprises:
   storing the invocation flow of microservice invocation data as key-value pairs, with the coarse-granular API name and a unique ID token as the key with the flow of microservices as the value.

5. The computer-implemented method of claim 3, further comprising:
   determining an execution of the coarse-granular API request is complete, wherein the execution of the coarse-granular API is complete when a response is ready to be sent back to a caller; and
   responsive to determining the execution of the coarse-granular API request is complete, generating a visualization for the flow of microservices.

6. The computer-implemented method of claim 4, wherein the visualization for the flow of microservices is based on at least one or more relationships between a sequence of microservices invoked.

7. The computer-implemented method of claim 1, wherein generating an invocation flow for the coarse-granular API request further comprises:
   constructing the flow of microservices based on the unique ID and respective sequence number associated with the one or more functions within the one or more microservices invoked by the coarse-granular API request and one or more associated metrics of the one or more functions.

8. A computer system for visualizing end-to-end flow of microservice invocations from a coarse-granular application programming interface ("API") within a containerized environment, the system comprising:
one or more computer processors;
one or more computer readable storage media; and
computer program instructions stored on the one or more computer readable storage media for execution by the one or more computer processors to:
intercept the coarse-granular API request at an ingress within the containerized environment;
annotate the coarse granular API request with a unique identifier ("ID");
monitor one or more invocations resulting from the coarse granular API request;
annotate one or more functions within one or more microservices invoked by the coarse-granular API request with a respective sequence number; and
generate an invocation flow for the coarse-granular API request based on the unique ID associated with the coarse-granular API request and the respective sequence number associated with the one or more functions within the one or more microservices.

9. The computer system of claim 8, wherein monitoring one or more invocations resulting for the coarse-granular API request further comprises program instructions to:
intercept the one or more invocations resulting from the coarse granular API request at the one or more microservices invoked by the coarse-granular API request; and
extract the unique ID from the invocation associated with a microservice invocation.

10. The computer system of claim 8, further comprising program instructions to:
update a containerized environment state database with the unique ID of the coarse-granular API and respective sequence number of the one or more functions within the or more microservices invoked by the course granular API request.

11. The computer system of claim 10, wherein updating the containerized environment state database further comprises instructions to:
store the invocation flow of microservice invocation data as key-value pairs, with the coarse-granular API name and a unique ID token as the key with the flow of microservices as the value.

12. The computer system of claim 10, further comprising program instructions to:
determine an execution of the coarse-granular API request is complete, wherein the execution of the coarse-granular API is complete when a response is ready to be sent back to a caller; and
responsive to determining the execution of the coarse-granular API request is complete, generate a visualization for the flow of microservices.

13. The computer system of claim 12, wherein the visualization for the flow of microservices is based on at least one or more relationships between a sequence of microservices invoked.

14. The computer system of claim 13, wherein generating an invocation flow for the coarse-granular API request further comprises program instructions to:
construct the flow of microservices based on the unique ID and respective sequence number associated with the one or more functions within the one or more microservices invoked by the coarse-granular API request and one or more associated metrics of the one or more functions.

15. A computer program product for visualizing an end-to-end flow of microservice invocations from a coarse-granular application programming interface ("API") within a containerized environment, the computer program product comprising one or more computer readable storage media and program instructions sorted on the one or more computer readable storage media, the program instructions including instructions to:
intercept the coarse-granular API request at an ingress within the containerized environment;
annotate the coarse granular API request with a unique identifier ("ID");
monitor one or more invocations resulting from the coarse granular API request;
annotate one or more functions within one or more microservices invoked by the coarse-granular API request with a respective sequence number; and
generate an invocation flow for the coarse-granular API request based on the unique ID associated with the coarse-granular API request and the respective sequence number associated with the one or more functions within the one or more microservices.

16. The computer program product of claim 15, wherein monitoring one or more invocations resulting for the coarse-granular API request further comprises program instructions to:
intercept the one or more invocations resulting from the coarse granular API request at the one or more microservices invoked by the coarse-granular API request; and
extract the unique ID from the invocation associated with a microservice invocation.

17. The computer program product of claim 15, further comprising program instructions to:
update a containerized environment state database with the unique ID of the coarse-granular API and respective sequence number of the one or more functions within the or more microservices invoked by the course granular API request.

18. The computer program product of claim 17, wherein updating the containerized environment state database further comprises instructions to:
store the invocation flow of microservice invocation data as key-value pairs, with the coarse-granular API name and a unique ID token as the key with the flow of microservices as the value.

19. The computer program product of claim 17, further comprising program instructions to:
determine an execution of the coarse-granular API request is complete, wherein the execution of the coarse-granular API is complete when a response is ready to be sent back to a caller; and
responsive to determining the execution of the coarse-granular API request is complete, generate a visualization for the flow of microservices.

20. The computer program product of claim 19, wherein generating an invocation flow for the coarse-granular API request further comprises program instructions to:
construct the flow of microservices based on the unique ID and respective sequence number associated with the one or more functions within the one or more microservices invoked by the coarse-granular API request and one or more associated metrics of the one or more functions.

\* \* \* \* \*